(12) United States Patent
Beauchamp et al.

(10) Patent No.: US 11,806,932 B2
(45) Date of Patent: Nov. 7, 2023

(54) LARGE ARRAY STEREOLITHOGRAPHY WITH EFFICIENT OPTICAL PATH

(71) Applicant: 3D Systems, Inc., Rock Hill, SC (US)

(72) Inventors: Robert W. Beauchamp, Carlsbad, CA (US); Ning Zheng, Charlotte, NC (US); James Francis Smith, III, Tega Cay, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 0 days.

(21) Appl. No.: 17/731,468

(22) Filed: Apr. 28, 2022

(65) Prior Publication Data

US 2022/0250320 A1  Aug. 11, 2022

Related U.S. Application Data

(63) Continuation of application No. 16/837,699, filed on Apr. 1, 2020, now Pat. No. 11,345,089.

(60) Provisional application No. 62/833,055, filed on Apr. 12, 2019.

(51) Int. Cl.
| | |
|---|---|
| *B33Y 30/00* | (2015.01) |
| *B29C 45/00* | (2006.01) |
| *B29C 59/00* | (2006.01) |
| *B29C 63/02* | (2006.01) |
| *B29C 69/00* | (2006.01) |

(Continued)

(52) U.S. Cl.
CPC ............ *B29C 64/277* (2017.08); *B29C 45/00* (2013.01); *B29C 59/00* (2013.01); *B29C 63/02* (2013.01); *B29C 64/286* (2017.08); *B29C 69/007* (2013.01); *B33Y 30/00* (2014.12); *B33Y 70/00* (2014.12); *B29C 64/393* (2017.08); *B33Y 50/02* (2014.12)

(58) Field of Classification Search
CPC ... B29C 64/277; B29C 64/286; B29C 64/135; B29C 64/393; B29C 69/007; B29C 63/02; B29C 59/00; B29C 45/00; B33Y 30/00; B33Y 50/02; B33Y 70/00
See application file for complete search history.

(56) References Cited

U.S. PATENT DOCUMENTS

| | | |
|---|---|---|
| 2011/0014499 A1 | 1/2011 | Uchida |
| 2018/0071976 A1 | 3/2018 | Tumbleston et al. |

FOREIGN PATENT DOCUMENTS

| | | |
|---|---|---|
| CN | 104108182 | 10/2014 |
| CN | 106915078 | 7/2017 |

(Continued)

OTHER PUBLICATIONS

European Patent Communication for European Application No. 20720314.2 dated Sep. 26, 2022 (7 pages).

(Continued)

*Primary Examiner* — Philip C Tucker
*Assistant Examiner* — Jimmy R Smith, Jr.

(57) ABSTRACT

A three-dimensional printing system includes a resin vessel containing resin, an imaging bar, a movement mechanism coupled to the imaging bar, and a controller. The imaging bar includes an arrangement of light emitting devices that selectively emit radiation from an exit surface of the imaging bar to define a build plane in the resin. The exit surface of the imaging bar is preferably less than 10 millimeters from the build plane. The controller is configured to scan the imaging bar along a scan axis and, concurrent with scanning, operate the imaging bar to selectively image a layer of resin at the build plane.

20 Claims, 6 Drawing Sheets

(51) Int. Cl.
*B29C 64/277* (2017.01)
*B33Y 70/00* (2020.01)
*B29C 64/286* (2017.01)
B33Y 50/02 (2015.01)
B29C 64/393 (2017.01)

(56) References Cited

FOREIGN PATENT DOCUMENTS

| | | |
|---|---|---|
| CN | 108943715 | 12/2018 |
| CN | 208324234 | 1/2019 |
| EP | 2226683 | 9/2010 |
| JP | H11254543 | 9/1999 |

OTHER PUBLICATIONS

PCT International Search Report for International Search Authority for PCT/US2020/026195 dated Apr. 1, 2020 (7 pages).
PCT International Written Opinion for International Search Authority for PCT/US2020/026195 dated Apr. 1, 2020 (8 pages).
English translation by IPPH ST36 XML through DFP for CN104108182.
English translation from EPO by Thomson Native Mat through DFP for JP H11254543.
European Patent Office (EPO) machine translation for CN208324234.
English translation by IPPH ST36 XML through DFP for CN106915078.
English Translation of Japanese Application No. 2021-557360, dated Oct. 11, 2022 (4 pages).
English Machine Translation of Chinese Patent Application Publication No. 108943715 (18 pages).

LARGE ARRAY STEREOLITHOGRAPHY WITH EFFICIENT OPTICAL PATH

CROSS REFERENCE TO RELATED APPLICATIONS

This application is a continuation of U.S. application Ser. No. 16/837,699 which was filed on Apr. 1, 2020, which claims priority to U.S. Provisional Application Ser. No. 62/833,055, Entitled "LARGE ARRAY STEREOLITHOGRAPHY WITH EFFICIENT OPTICAL PATH" by Robert W. Beauchamp, et al., filed on Apr. 12, 2019, incorporated herein by reference under the benefit of U.S.C. 119(e).

FIELD OF THE INVENTION

The present disclosure concerns an apparatus and method for fabrication of solid three dimensional (3D) articles of manufacture from radiation curable (photocurable) resins. More particularly, the present disclosure improves productivity and optical efficiency of a large array stereolithography system.

BACKGROUND

Three dimensional (3D) printers are in rapidly increasing use. One class of 3D printers includes stereolithography printers having a general principle of operation including the selective curing and hardening of radiation curable (photocurable) liquid resins. A typical stereolithography system includes a resin vessel holding the photocurable resin, a movement mechanism coupled to a support surface, and a controllable light engine. The stereolithography system forms a three dimensional (3D) article of manufacture by selectively curing layers of the photocurable resin. Each selectively cured layer is formed at a "build plane" within the resin. One challenge with these systems is to improve the speed of processing for large build plane systems. Another challenge is optical efficiency.

SUMMARY

Figure 1:
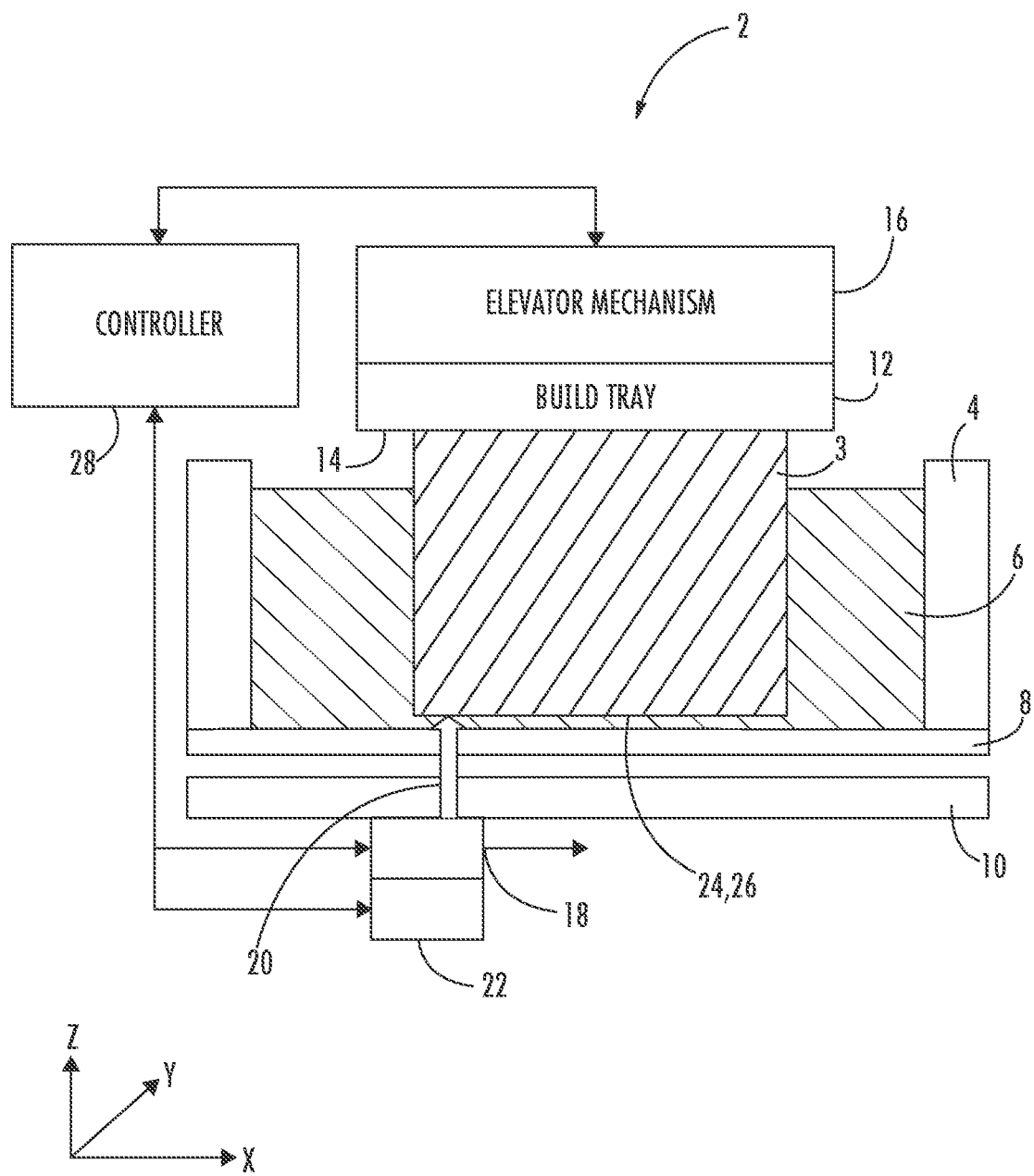
FIG. 1 is a schematic drawing of a first embodiment of a three-dimensional printing system for fabricating a three-dimensional article.

In a first aspect of the disclosure, a three-dimensional printing system includes a resin vessel containing resin, an imaging bar, a movement mechanism coupled to the imaging bar, and a controller. The imaging bar includes an arrangement of light emitting devices that selectively emit radiation from an exit surface of the imaging bar to define a build plane in the resin. The exit surface of the imaging bar is less than 10 millimeters from the build plane. The controller is configured to scan the imaging bar along a scan axis and, concurrent with scanning, operate the imaging bar to selectively image a layer of resin at the build plane.

In one implementation the imaging bar includes a substrate, a collimation layer, a lenslet layer, and an aperture layer. The substrate includes the arrangement of light emitting devices. The collimation layer overlays the substrate and defines a plurality of collimators that individually align with the light emitting devices. The lenslet layer overlays the collimation layer and has a plurality of lenslets that individually align with the collimators. The aperture layer overlays the lenslet layer and has a mask defining a plurality of apertures that individually align with the lenslets.

In a second aspect of the disclosure, a three-dimensional printing system includes a resin vessel containing resin, an imaging bar, a movement mechanism coupled to the imaging bar, and a controller. The imaging bar includes a substrate, a collimation layer, a lenslet layer, and an aperture layer. The collimation layer overlays the substrate and defines a plurality of collimators that individually align with the light emitting devices. The lenslet layer overlays the collimation layer and has a plurality of lenslets that individually align with the collimators. The aperture layer overlays the lenslet layer and has a mask defining a plurality of apertures that individually align with the lenslets. The controller is configured to scan the imaging bar along a scan axis and, concurrent with scanning, operate the imaging bar to selectively harden a layer of resin at the build plane.

In one implementation the collimation layer includes a sheet of polymer material that defines the collimators. The collimators can be parabolic openings extending through the sheet. The parabolic openings have a reflective concave surface material lining. The collimators can have other optimized shapes besides being parabolic for collimation as well. The collimation layer with the collimators can be formed by injection molding or by micro embossing. The reflective concave surface can be formed by vacuum deposition of a metal onto the collimators. The polymer sheet material can be one or more of cyclic olefin polymer (COP), Polydimethylsiloxane (PDMS), acrylic, and cyclic olefin copolymer (COC).

In another implementation the lenslet layer includes a polymer sheet that defines the lenslets. The lenslets can be formed by injection molding or by micro embossing. The polymer sheet material can be one or more of cyclic olefin polymer (COP), Polydimethylsiloxane (PDMS), acrylic, and cyclic olefin copolymer (COC).

In yet another implementation, the lenslet layer can include two lenslet layers. Lenslets of the two layers have aligned optical axes.

In a further implementation, the aperture layer is a rigid plate. The rigid plate can be glass. The mask can be a patterned metal layer. The mask defining the apertures can be on an inside surface of the glass plate. The apertures are individually defined by etching the metal layer to define an aperture which is a spot at which the metal has been etched away.

DETAILED DESCRIPTION OF THE PREFERRED EMBODIMENTS

FIG. 1 is a schematic drawing of a first embodiment of a three-dimensional printing system 2 for fabricating a three-dimensional article 3. In describing system 2, mutually orthogonal axes X, Y, and Z can be used. Axes X and Y are lateral axes that are generally horizontal. Axis Z is a vertical axis that is generally aligned with a gravitational reference. Generally aligned means aligned by design but to within normal manufacturing tolerances. The axis X can be referred to as a scan axis. The axis Y can be referred to as a transverse axis.

System 2 includes a resin vessel 4 containing photocurable resin 6. Resin vessel 4 includes a transparent sheet 8 that provides a lower bound for the resin 6. Below the transparent sheet 8 is a rigid transparent plate 10. A build tray 12 has a lower face 14 for supporting article 3. An elevator mechanism 16 is coupled to the build tray 12.

An imaging bar 18 is disposed below plate 10 and is configured to emit radiation 20 in a generally upward direction. The imaging bar 18 is coupled to a carriage 22 that imparts lateral motion of the imaging bar 18 with respect to a build plane 24 along one or two lateral axes. The lateral motion allows the imaging bar 18 to address the build plane 24 to selectively harden resin onto a lower face 26 of article 3.

A controller 28 is coupled to and configured to control the elevator mechanism 16, the imaging bar 18, and the carriage 22. The controller 28 includes a processor coupled to an information storage device. The information storage device includes a non-transitory computer readable storage medium that stores computer-readable program code portions. In response to execution by the processor, the computer-readable program code portions operate portions of system 2 to at least perform the following steps: (1) operate the elevator mechanism to position lower face 14 or lower face 26 at the build plane 26; (2) scan the imaging bar 18 along scan axis X, (3) concurrent with scanning, operate the imaging bar 18 to selectively image and harden resin 6 along the build plane 24, and (4) repeat steps (1)-(3) to complete fabrication of the article 3 in a layer-by-layer manner. In one embodiment, an added step can include motion along the transverse axis Y in order to fully address the build plane 24.

Figure 2:
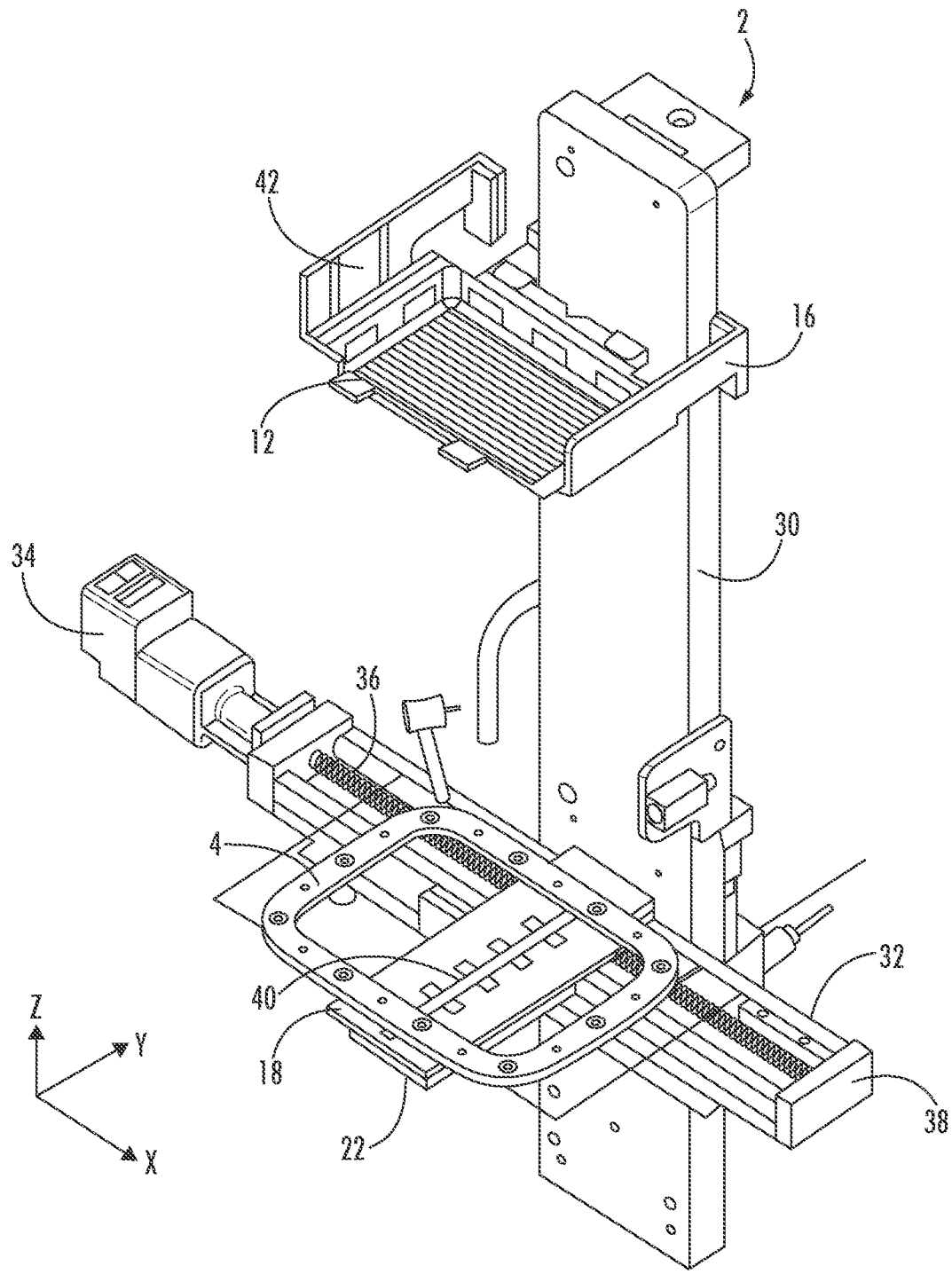
FIG. 2 is an isometric drawing of a particular embodiment of the first embodiment of FIG. 1.

FIG. 2 is a isometric drawing of a particular embodiment of the three-dimensional printing system 2 of FIG. 1. System 2 includes a main vertical support 30. The resin vessel 4 is mounted to the main vertical support 30 by an underlying support plate (not shown to allow illustration of some other components).

A scanning mechanism 32 is configured to scan the carriage 22 and imaging bar 18 along the scan axis X. Scanning mechanism 32 includes a motor 34 coupled to a lead screw 36 that extends along the scan axis X. The lead screw 36 is fixed in a housing 38 and rotates about the axis X. Rotational motion of the lead screw 36 engages internal threads of carriage 22 and translates the carriage 22 along the scan axis X.

The imaging bar 18 includes an array 40 of light emitting devices that span the build plane 24 along the transverse axis Y. Thus, scanning motion of the imaging bar along X allows the array 40 of light emitting devices to fully address the build plane 24.

The elevator mechanism 16 includes a pair of arms 42 that support the build tray 12. The elevator mechanism also includes a motor (not shown) and lead screw (not shown) for vertical transport of the arms 42 and build tray 12. The lead screw extends along and rotates about vertical axis Z.

Figure 3:
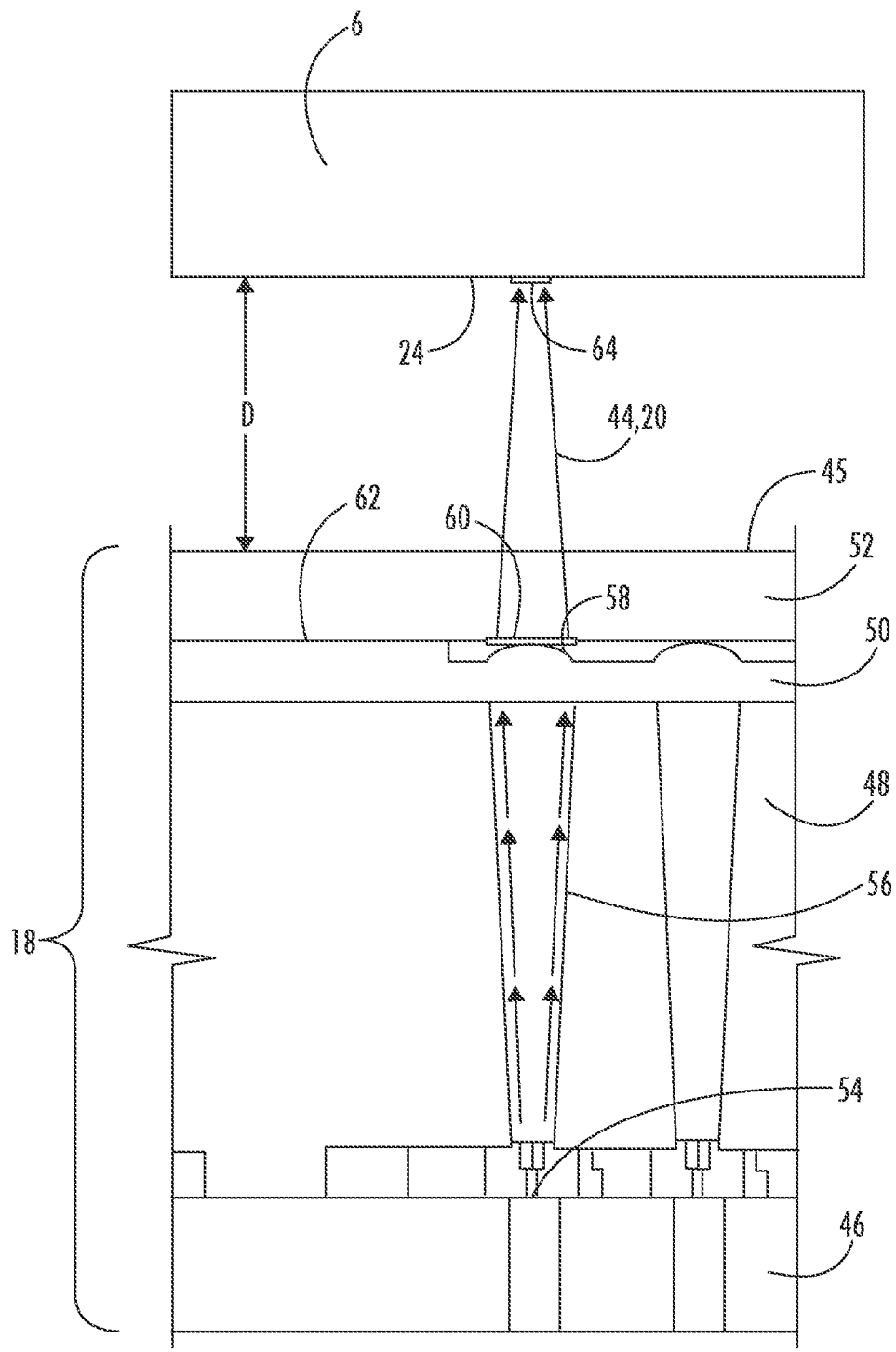
FIG. 3 is a diagram depicting an embodiment of an optical path from light generation within an imaging bar to a build plane.

FIG. 3 is a diagram depicting an embodiment of an optical path 44 from light generation within the imaging bar 18 to the build plane 24. Radiation 20 emerges from an exit surface 45 of the imaging bar 18 before traversing a distance D to the build plane 24. In an illustrative embodiment, the distance D is less than 10 millimeters. More particularly D is less than 5 millimeters or in a range of 3 to 4 millimeters. In a particular example, D can be about 3.6 millimeters. The short distance from the exit surface 46 to the build plane improves an optical efficiency of the imaging bar 18.

The imaging bar 18 includes a layered structure including a substrate 46, a collimation layer 48, a lenslet layer 50, and a aperture layer 52. Substrate 46 includes a plurality or array 40 of light emitting devices 54 which can be light emitting diodes (LEDs) 54. The substrate 46 can include a printed circuit board (PCB) with attached discrete LEDs. In other embodiments, the light emitting devices 54 can be formed directly onto the substrate 46. In one embodiment, the substrate 46 can be formed with processes similar to those for forming flat panel displays.

The collimation layer 48 defines a plurality of collimators 56 that are individually aligned with the light emitting devices 54. In one embodiment, the collimation layer 48 is an injection molded or micro embossed polymer. The collimators 56 can be openings that extend vertically through the collimation layer 48 and that are lined with a reflective material such as a metal.

The lenslet layer 50 includes a plurality of lenslets 58 that individually align with the light emitting devices 54 and collimators 56. Lenslet layer 50 can include more than one layer of lenslets 58 as will be illustrated with respect to FIG. 5. Like the collimation layer 48, the lenslet layer 50 can be an injection molded or micro embossed polymer. Layer 48 or 50 can be formed from an optical grade polymer which can be one or more of cyclic olefin polymer (COP), Polydimethylsiloxane (PDMS), acrylic, cyclic olefin copolymer (COC), and other optical grade polymers.

The aperture layer 52 or plate defines a plurality of apertures 60 that individually align with the lenslets 58, the light emitting devices 54, and collimators 56. The apertures are defined by a mask layer 62 which can be a metal layer 62. The aperture layer 52 can be a metallized glass plate 52. In the illustrated embodiment, the metal layer 62 is on the inside of the glass plate 52. The metal layer can be formed from a process such as a thin film deposition onto a surface of the glass plate 52 followed by etching to define apertures 60 openings 60 in the metal layer 62. The apertures 60 are openings or clear windows in the metal layer 62. As illustrated, the layers of imaging bar 18 define the optical path 44 from the light emitting device 54 to a spot 64 in the build plane 24. In the illustrated embodiment, aperture layer 52 can have a thickness of about 1 millimeter.

Figure 4:
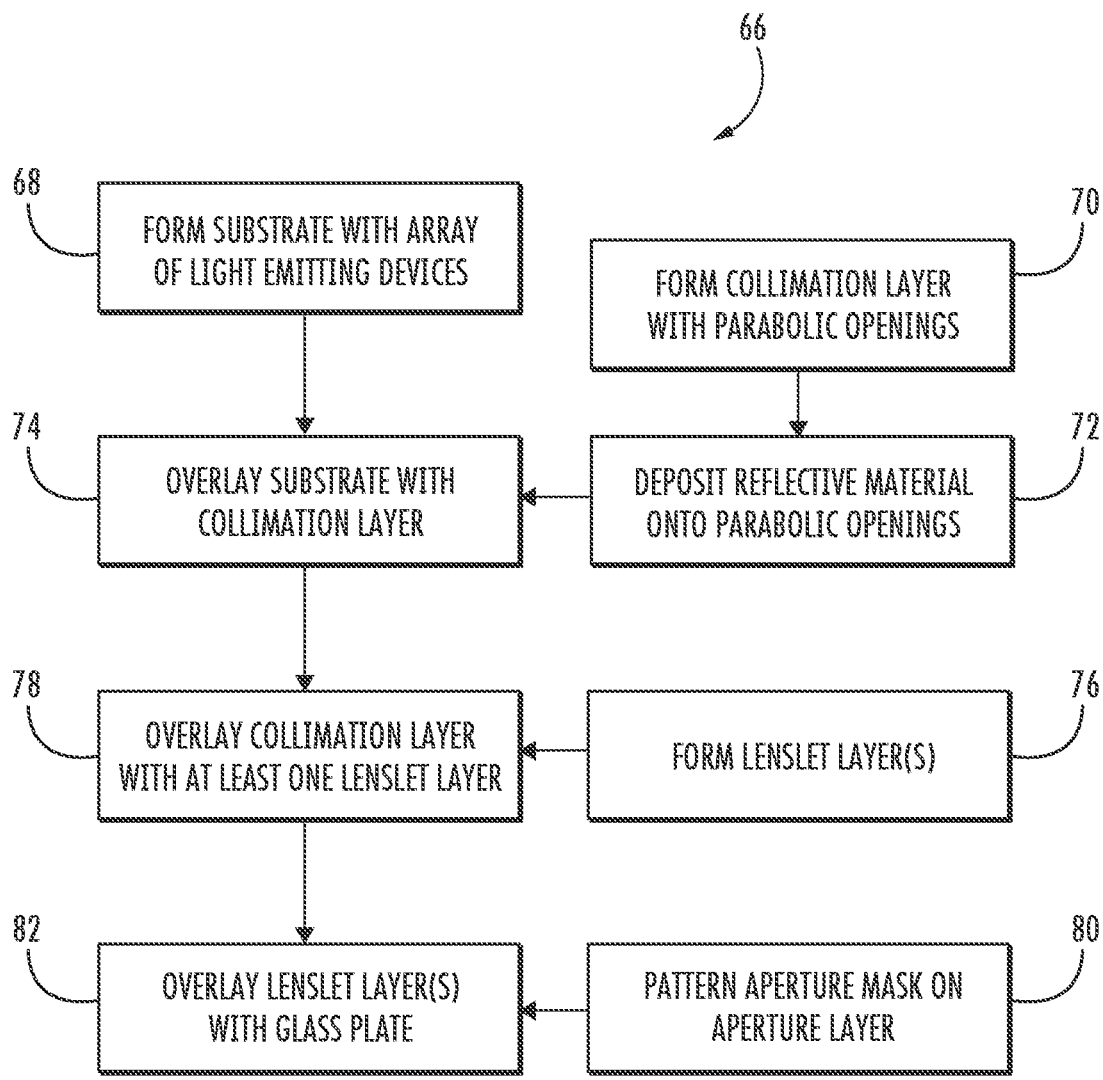
FIG. 4 is a flowchart depicting an embodiment of a portion of a method of manufacturing an imaging bar.

FIG. 4 is a flowchart depicting a portion of a method 66 of manufacturing the imaging bar 18. The illustrated steps of method 66 are not necessarily indicative of a particular sequential order. Illustrated steps 70, 72, 76, and 80 can be performed asynchronously from other steps. However, steps 68, 74, 78, and 80 would tend to occur in a sequence since these steps are a sequence of overlaid layers.

According to 68, the substrate 46 with an array 40 of the light emitting devices 54 is manufactured. In one embodiment, manufacture of substrate 46 includes fabrication of the light emitting devices 54 directly onto the substrate in a manner similar to the manufacture of a flat panel display. In another embodiment, the light emitting devices 54 are discrete packaged devices that are mounted to the substrate 46 via a pick and place operation before being wire bonded to circuitry on substrate 46. In yet another embodiment, the LEDs are referred to as "micro-LEDs" that are fabricated into one or more elongate substrates.

According to 70, the collimation layer 48 is fabricated with openings for defining the collimators 56. The openings can be parabolic or another optimized shape. In one embodiment, the collimation layer 48 is formed by injection molding a polymer. In another embodiment, the collimation layer 48 is formed by a micro embossing process (heat and pressure applied by a metal master). According to 72, a reflective material is deposited onto the openings to define the collimators 56. In one embodiment, 72 includes vacuum deposition of a metal. Step 72 can also include deposition of a passivation material over the metal. According to 74, the collimation layer 48 is attached or laminated over the substrate with the collimators 56 individually aligned to the light emitting devices 54.

According to 76, the lenslet layer(s) 50 are fabricated. As with the collimation layer 48, the lenslet layer 50 can be fabricated using injection molding, micro embossing, or another process. Step 76 can also include a deposition of one or more optical coatings onto the lenslets. According to 78, the lenslet layer 50 is attached or laminated over the collimation layer 48 with the lenslets 58 individually aligned to the collimators 56.

According to 80, an aperture mask is patterned onto the aperture layer 52. In an illustrative embodiment, step 80 includes patterning a metal mask layer 62 (such as chromium) onto a glass plate to provide an aperture plate 52. This can be accomplished by using a thin film deposition process to overlay the aperture plate 52 with a metal mask layer 62 and then selectively etching away the metal mask layer 62 to define the apertures 60. An aperture 60 is therefore defined by a spot at which the metal mask layer 62 is etched away. According to 82 the aperture layer 52 is attached over the lenslet layer 50 with the apertures 60 individually aligned with the lenslets 58.

Figure 5:
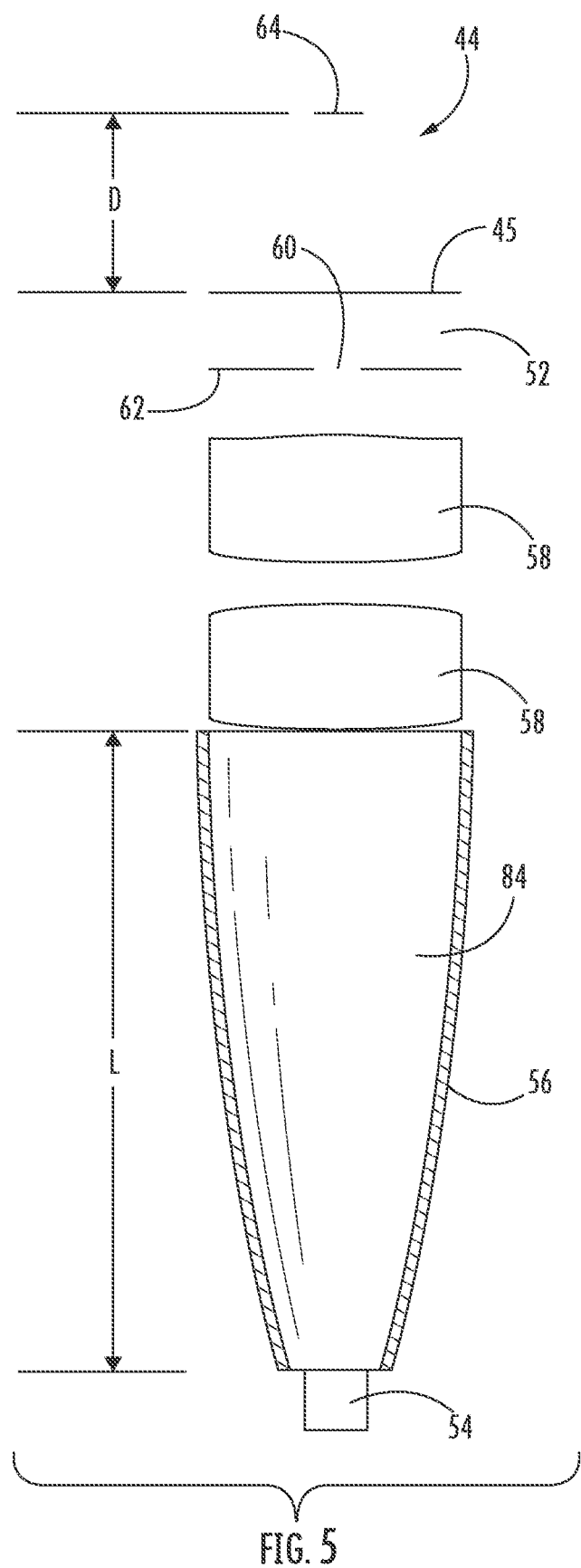
FIG. 5 is a diagram depicting an embodiment of an optical path between a light emitting device and a spot on a build plane.

FIG. 5 is a diagram depicting an embodiment of an optical path 44 between a light emitting device or LED 54 and a spot 64 on the build plane 24. In the illustrated embodiment, the LED 54 emits light with a wide cone of angles. Because of this, only a small percentage of light from the LED 54 can be imaged onto the spot 64 without the use of the collimator 56.

Collimator 56 has a reflective surface 84 that reflects and redirects off-angle light so that it can pass through the lenslets 58 and the aperture 60 to reach spot 64. In the illustrated embodiment, surface 84 has a parabolic shape, but other optimized surface shapes are possible. In an illustrative embodiment, collimator 56 has a length L along Z equal to about 5 millimeters. Collimator 56 has an aspect ratio (length to width or length to diameter) to be more effective in redirecting off-angle light rays. The aspect ratio can be greater than three, greater than four, or about five.

Lenslets 58 focus the beams from the collimator 56 onto the spot 64. The aperture 60 eliminates off-angle light rays that would not be constrained to the spot 64. In an illustrative embodiment, the spot has a lateral dimension of about 0.15 millimeter.

Figure 6:
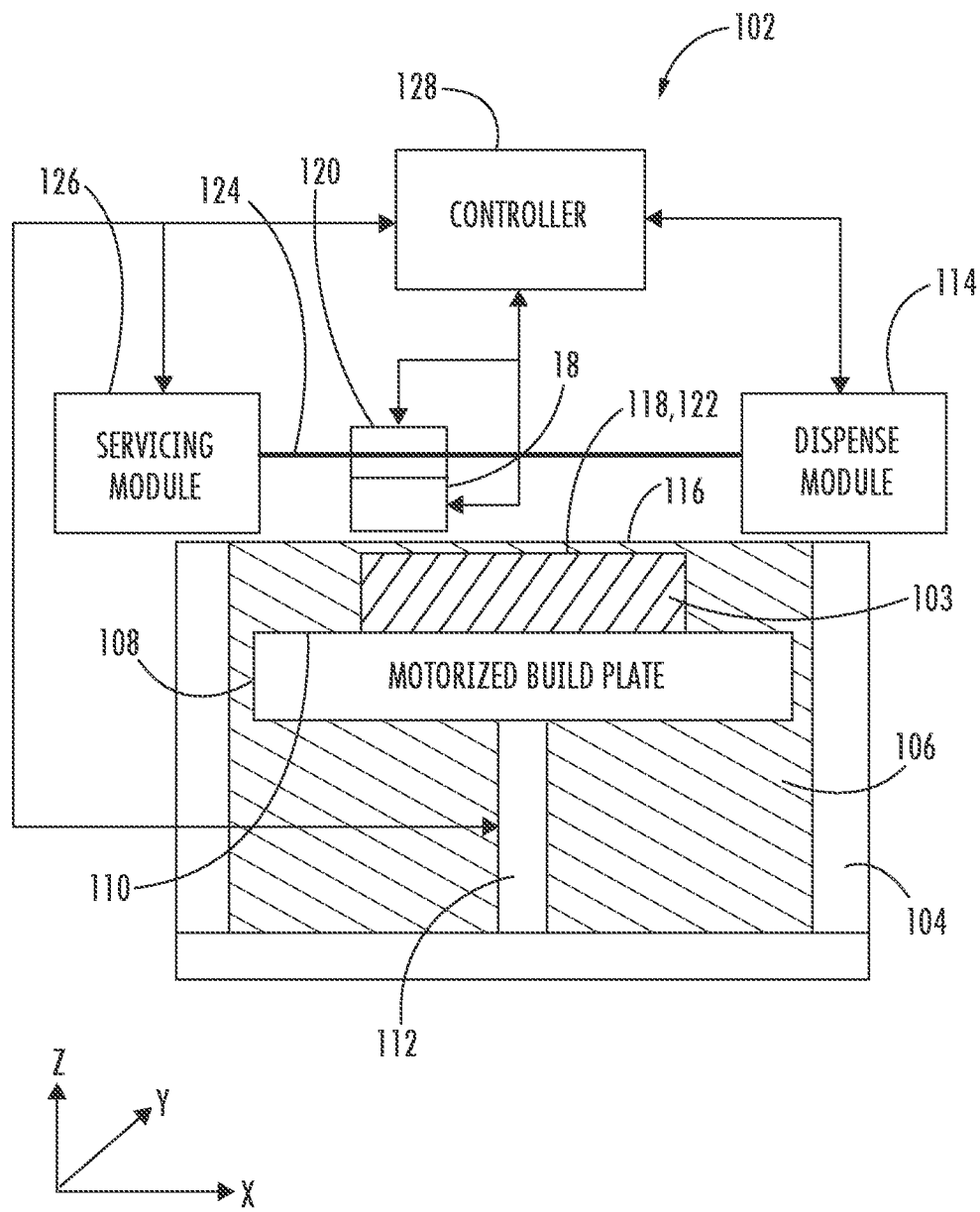
FIG. 6 is a schematic drawing of a second embodiment of a three-dimensional printing system for fabricating a three-dimensional article.

FIG. 6 is a schematic drawing of a second embodiment of a three-dimensional printing system 102 for fabricating a three-dimensional article 103. System 102 includes a resin vessel 104 containing photocurable resin 106. A motorized build plate 108 is positioned within resin 106 and has an upper face 110 for supporting the three-dimensional article 103. An elevator mechanism 112 is coupled to the motorized build plate 108. A dispense module 114 is configured to dispense a layer 116 of the resin 106 upon an upper face 118 of the three-dimensional article 103.

An imaging bar 18 is disposed above the resin layer 116 and is configured to emit radiation in a generally downward direction. The imaging bar 18 is coupled to a carriage 120 that imparts lateral motion of the imaging bar with respect to a build plane 122 along one or two axes. The lateral motion allows the imaging bar 18 to address the build plane 122 to selectively harden resin onto the upper face 118 of article 3. In the illustrated embodiment, dispense module 114 and carriage 120 translate along a slider rod 124.

Imaging bar 18 is similar to that depicted in FIGS. 1-5 except that it is inverted to emit radiation downwardly rather than upwardly. As depicted in the earlier figures, the imaging bar 18 has an exit surface 45 that is less than 10 millimeters or less than 5 millimeters from the build plane 122. In an illustrative embodiment, the distance D from the exit surface 45 to build plane 122 can be in the range of 3 to 4 millimeters. As the imaging bar 18 passes over the resin, a film of resin can accumulate on the exit surface 45.

A servicing module 126 is positioned along the slider rod 124 at a lateral side of the resin vessel 104. Carriage 120 can translate along the slider rod 124 and position the imaging bar 18 in the servicing module 126. The servicing module 126 is configured to remove accumulated resin from exit surface 45. Servicing module 126 can also be configured to deposit a release layer or oxidizer on the exit surface 45 to prevent adhesion and/or curing of resin 106 onto the exit surface 45.

The servicing module 126 can include a wiper (not shown) and/or other features for removing the resin residue from the exit surface 45. The wiper can include a fixed or movable wiper blade or a rotary wiper. The servicing module 126 can also include a dispenser (not shown) that dispenses the oxidizer onto the exit surface 45.

A controller 128 is coupled to and configured to control the elevator mechanism 112, the dispense module 114, the carriage 120, the imaging module 18, and the servicing module 126. The controller includes a processor coupled to an information storage device. The information storage device includes a non-transitory computer readable storage medium that stores computer-readable program code portions.

In response to execution by the processor, the computer-readable program code portions operate portions of system 102 to at least perform the following steps: (1) operate the elevator mechanism to position the upper face (110 or 118) at build plane 122, (2) operate carriage 120 to scan the imaging bar 18 along scan axis X and over a swath of the build plane 122, (3) concurrent with scanning, operate the imaging bar 18 to selectively image and harden the thin resin layer 116 along build plane 122, and (4) repeat steps (1)-(3) to complete fabrication of the article 3 in a layer-by-layer manner. In one embodiment, an added step can include incremental motion of the carriage along the transverse axis Y between scans. In another embodiment, a single scan addresses the entire build plane 122 along transverse axis Y.

In response to execution by the processor, the computer-readable program code portions operate portions of system 102 to at least perform the following additional steps: (A) operate the carriage 124 to move the imaging bar 18 into the servicing module, and (B) operate the servicing module 126 to clean resin residue from the exit surface 45. In some embodiments, step (B) can also include depositing a release or oxidizing film onto the exit surface 45. Steps (A) and (B) can occur before or after a scan of the imaging bar 18 over build plane 122 during fabrication of the article 3. Steps (A) and (B) can occur with any frequency that maintains a clean exit surface 45.

In some embodiments, step (B) above can include: (B1) Impart motion between a wiper to and the exit surface 45 to wipe resin residue from the exit surface 45. (B2) Operate a dispenser to dispense a layer of the release or oxidizing film onto the exit surface 45. For such embodiments, the servicing module 126 includes the wiper, dispenser, and any apparatus required to impart motion with respect to the exit surface as needed.

The specific embodiments and applications thereof described above are for illustrative purposes only and do not preclude modifications and variations encompassed by the scope of the following claims.

What is claimed:

1. A method of manufacturing and configuring an imaging system including an imaging bar configured to image a build plane in a three-dimensional printing system comprising:
   providing a substrate with an array of light emitting devices;
   fabricating a polymer material collimation layer having an array of collimators corresponding to the array of light emitting devices, the array of collimators including an array of openings that extend through the polymer material and have reflective inside surfaces; and
   overlay the polymer material collimation layer onto the substrate with the array of collimators aligning to the array of light emitting devices, the array of collimators is configured to reflect and redirect light from the array of light emitting devices.

2. The method of claim 1 wherein fabricating the polymer collimation layer includes one of injection molding the polymer material collimation layer and a micro embossing the polymer material collimation layer.

3. The method of claim 1 wherein fabricating the polymer collimation layer includes vacuum deposition of a metal to form the reflective inside surfaces.

4. The method of claim 1 wherein the openings are parabolic.

5. The method of claim 1 wherein the openings have a length to width ratio greater than three.

6. The method of claim 1 further comprising overlaying the polymer material collimation layer with at least one lenslet layer.

7. The method of claim 6 wherein the at least one lenslet layer includes two lenslet layers.

8. The method of claim 6 further comprising overlaying the at least one lenslet layer with an aperture layer.

9. The method of claim 8 wherein the aperture layer includes a glass plate with a metal mask layer defining apertures that are individually aligned to lenslets within the at least one lenslet layer.

10. The method of claim 1 wherein the imaging bar defines an exit surface and the method further comprises mounting the imaging bar into the three-dimensional printing system with the exit surface less than 10 millimeters from the build plane.

11. The method of claim 10 wherein the exit surface is less than 5 millimeters from the build plane.

12. A method of manufacturing and configuring an imaging system including an imaging bar configured to emit radiation from an exit surface and to image a build plane in a three-dimensional printing system comprising:
   providing a substrate with an array of light emitting devices;
   fabricating a polymer material collimation layer having an array of collimators corresponding to the array of light emitting devices, the array of collimators including an array of openings that extend through the polymer material and have reflective inside surfaces;
   overlay the polymer material collimation layer onto the substrate with the array of collimators aligning to the array of light emitting devices, the array of collimators is configured to reflect and redirect light from the array of light emitting devices;
   overlay the polymer material collimation layer with a lenslet layer;
   overlay the lenslet layer with an aperture layer; and
   mounting the imaging bar into the three-dimensional printing system with the exit surface less than 10 millimeters from the build plane.

13. The method of claim 12 wherein fabricating the polymer collimation layer includes one of injection molding the polymer material collimation layer and a micro embossing the polymer material collimation layer.

14. The method of claim 12 wherein fabricating the polymer collimation layer includes vacuum deposition of a metal to form the reflective inside surfaces.

15. The method of claim 12 wherein the openings are parabolic with a length to width ratio of greater than 3.

16. The method of claim 12 further comprising forming the lenslet layer from injection molding or micro embossing a polymer material.

17. The method of claim 16 wherein the polymer material is one or more of cyclic olefin polymer (COP), Polydimethylsiloxane (PDMS), acrylic, and cyclic olefin copolymer (COC).

18. The method of claim 12 wherein the aperture layer includes a rigid plate with a metal layer.

19. The method of claim 18 further comprising patterning the metal layer to define optical apertures corresponding to the light emitting devices.

20. A method of manufacturing and configuring an imaging system including an imaging bar configured to emit radiation from an exit surface and to image a build plane in a three-dimensional printing system comprising:
   providing a substrate with an array of light emitting devices;
   fabricating a polymer material collimation layer having an array of collimators corresponding to the array of light emitting devices, the array of collimators including an array of openings that extend through the polymer material and have reflective inside surfaces;
   overlay the polymer material collimation layer onto the substrate with the array of collimators aligning to the array of light emitting devices, the array of collimators is configured to reflect and redirect light from the array of light emitting devices;
   fabricating one or more lenslet layers individually having a plurality of lenslets;
   overlay the polymer material collimation layer with the one or more lenslet layers with each of the plurality of lenslets overlaying one of the array of collimators;
   patterning an aperture mask on an aperture layer, the aperture mask defining an array of optical apertures;
   overlay the lenslet layer with the aperture layer with each of the array of optical apertures overlaying one of the lenslets; and
   mounting the imaging bar into the three-dimensional printing system with the exit surface less than 10 millimeters from the build plane.

* * * * *